United States Patent
Desautels et al.

Patent Number: 5,879,267
Date of Patent: Mar. 9, 1999

[54] TWO-POSITION NEUTRAL SWITCH FOR MULTI-SPEED TRANSMISSION

[75] Inventors: Thomas Desautels, West Bloomfield; Charles E. Allen, Jr., Rochester Hills, both of Mich.; Jon M. Huber, Laurinburg, N.C.; Edward M. Bacon, Northville; Steve M. Weisman, Farmington Hills, both of Mich.; Steven E. Radue, Southern Pines, N.C.

[73] Assignee: Meritor Heavy Vehicle Systems, LLC, Troy, Mich.

[21] Appl. No.: 919,422

[22] Filed: Aug. 27, 1997

Related U.S. Application Data

[63] Continuation of Ser. No. 508,067, Jul. 27, 1995, Pat. No. 5,669,852.

[51] Int. Cl.⁶ .................................................. B60K 41/08
[52] U.S. Cl. .............................................................. 477/111
[58] Field of Search ........................ 477/111; 200/61–91

[56] References Cited

U.S. PATENT DOCUMENTS

| | | |
|---|---|---|
| 4,200,007 | 4/1980 | Espenschied et al. . |
| 4,275,618 | 6/1981 | Bale . |
| 4,388,843 | 6/1983 | Teeter . |
| 4,593,580 | 6/1986 | Schulze . |
| 4,811,224 | 3/1989 | Kuerschner . |
| 4,944,194 | 7/1990 | Tanoue et al. . |
| 5,411,450 | 5/1995 | Gratton et al. . |

FOREIGN PATENT DOCUMENTS

| | | |
|---|---|---|
| 0242086A3 | 10/1987 | European Pat. Off. . |
| 0364220A2 | 4/1990 | European Pat. Off. . |
| 0383436A1 | 8/1990 | European Pat. Off. . |

*Primary Examiner*—Dirk Wright

[57] ABSTRACT

An improved switch system is incorporated into a multi-speed transmission and engine combination. The switch system provides a positive electronic signal to an electronic control unit for the engine of both when the transmission is in a neutral state and when the transmission is in a gear-engaged state. In one embodiment, a switch plunger rides within a switch housing between two extreme positions. The switch plunger is at one axial position when the transmission is in neutral, and at the other axial position when the transmission is in a gear-engaged state. At either position, an electric circuit is completed and a signal is sent to an electronic control unit. The electronic control unit is thus provided with positive position feedback for the transmission. The electronic control unit will preferably also have the ability to control the engine speed to synchronize the engine speed with a desired engine speed for the next selected gear ratio to achieve synchronization between the speeds when the shift if completed. The electronic control unit does not begin to modify the engine speed until it has received a positive signal that the transmission is in neutral.

16 Claims, 2 Drawing Sheets

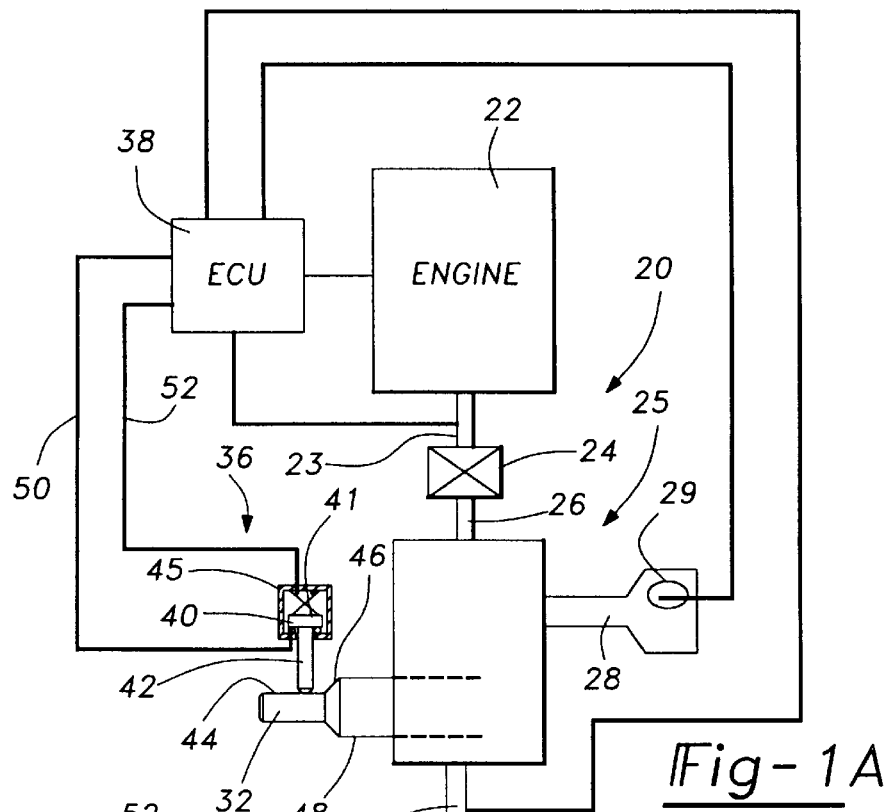
Fig-1A
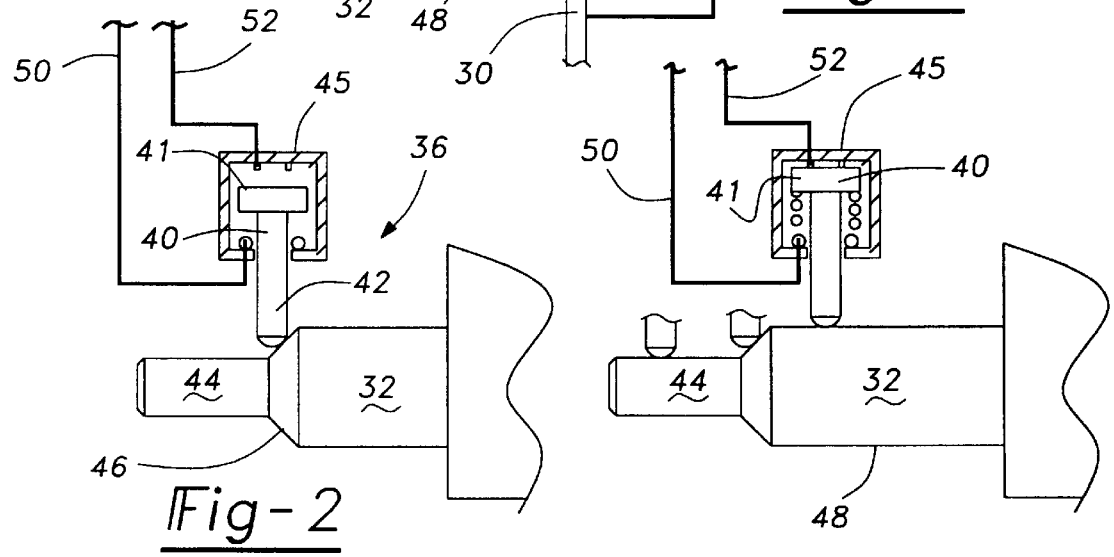
Fig-2
Fig-3

TWO-POSITION NEUTRAL SWITCH FOR MULTI-SPEED TRANSMISSION

BACKGROUND OF THE INVENTION

This application is a continuation application of U.S. patent application Ser. No. 08/508,067 with a filing date of Jul. 27, 1995, and U.S. Pat. No. 5,669,852 relates to an improvement in switches incorporated into multi-speed transmissions which provides a positive signal of when the transmission is in a gear-engaged state and when the transmission is in a neutral state.

Heavy vehicles are typically equipped with a manually activated multi-speed transmissions that may be shifted to provide several different speed ratios. The multi-speed transmission applies the several different speed ratios to the input from an engine, resulting in several different outlet speeds at the transmission output shaft. Typically, a clutch provided between the engine and the transmission may be selectively actuated by the vehicle operator to break the transmission between the engine and the multi-speed transmission. The clutch is typically actuated as the operator moves the transmission out of gear, and further assists the operator in re-engaging a gear to provide the next selected speed ratio.

The clutching associated with the shifting is relatively complicated in heavy vehicles. Moreover, modern heavy vehicles have become equipped with more and more controls that require complicated operating procedures. As such, it would be desirable to reduce the complexity of routine vehicle operation, such as changing the speed ratio of the multi-speed transmission.

To this end, the prior art has proposed systems wherein it is not necessary to actuate the clutch to shift the transmission. In one proposed system, an engine controller attempts to achieve a zero torque load between the engine and the transmission allowing the operator to move the gear out of engagement to a neutral position. The proposed system then attempts to synchronize the engine input speed to a speed that will assist in re-engagement of the gear.

These proposed systems are impractical. One major impracticality is that the proposed system does not include a positive feedback signal of the state of the multi-speed transmission. It would be undesirable to begin changing engine speed to synchronize the speed unless there is a clear indication that the transmission is in neutral. If the engine control begins to change engine speed and the transmission is actually in gear, this would affect the speed of the vehicle independent of any driver input, which would be undesirable. Moreover, the proposed system does not include any positive signal of when the transmission has been re-engaged at the new gear, such that the engine control knows when to return control of the engine speed to the vehicle operator.

Standard transmissions do include a switch which provides some indication of when the transmission is in neutral. Typically, this switch includes a moving shaft which engages other portions of the transmission to provide a signal of when the transmission is in neutral. The switch typically does not provide a positive signal of both neutral and gear-engaged states. Instead, a positive signal is only provided at one of the two states. If the positive signal is not sensed, then the control assumes that the other state is in place. This is somewhat deficient in that there is a transition stage between fully engaged and neutral, and a more sophisticated control would benefit from knowledge of when the transmission is in this transition state. Further, as noted above, it would be undesirable to begin to actuate speed control if the transmission is in gear. For that reason, it would be desirable to provide positive position feedbacks of both gear-engaged and neutral positions for the transmission.

At least one proposed system for an automatically adjusted multi-speed transmission discusses having signals at both a neutral and gear-engaged position. This system does not appear to be based upon mechanical actuation that would provide certainty as to the neutral or gear-engaged states. Rather, it would appear that this prior art system is based more upon counting movement of a motor that adjusts the speed of the transmission to determine the state of the transmission. With the type of speed synchronization systems envisioned by this invention, a positive signal of the actual state of the transmission would be more desirable than this proposed type system.

SUMMARY OF THE INVENTION

A disclosed embodiment of this invention includes a switching system that provides positive indications of both when a transmission is in neutral, and when the transmission is in a gear-engaged state. The switch is actuated by a mechanical shaft that is moved during movement of the transmission members. The shaft is mechanically connected to be in a certain position when the transmission is in neutral, and to be in a second position when the transmission is engaged. These positive signals are sent to an electronic control unit for an engine. The positive signals allow the electronic control unit to know precisely which state the transmission is in, and to affect engine speed controls based upon that state.

In one embodiment of this invention, the electronic control unit controls an engine that drives a multi-speed transmission through a clutch. A mechanical "neutral" shaft is associated with the transmission and moves as the transmission moves between gear-engaged and neutral states. In one preferred embodiment, the "neutral" shaft has a ramped surface, and the switch includes a switch plunger that moves along the ramped surface. The neutral shaft is connected to be mechanically moved by transmission components as the transmission moves between gear-engaged and neutral states. The plunger switch moves along the ramped surface with this change. The plunger switch completes an electrical contact at two extreme positions—one associated with a neutral state and one associated with a gear-engaged state. If a positive signal is received from either of the two contacts, then the electronic control unit knows precisely what state the transmission is in. If no signal is received, then the electronic control unit can determine that the transmission is in a transition phase between the neutral and gear-engaged modes. The electronic control unit can also look for a sequence between the two states. As an example, should the electronic control unit sense that the transmission has moved out of the gear-engaged state into transition state, the electronic control unit can sense the amount of time until the neutral state switch is engaged. If an undue amount of time is sensed, then a fault may be determined. Similarly, if the electronic control unit senses movement from neutral toward the gear-engaged state that lasts for an undue amount of time, a fault may also be indicated.

In a preferred method of controlling an engine according to the present invention, an operator provides an indication to an electronic control unit that a gear shift is being anticipated. The electronic control unit may control the engine to assist the operator in moving the transmission to a neutral state. The inventive neutral switch system provides a positive signal to the electronic control unit of when the transmission is engaged in gear. The electronic control unit thus can determine when the transmission has moved out of gear in a transition phase. The electronic control unit can also determine when the transmission has moved fully to the neutral state, since another switch contact will be made at that position. Once the electronic control unit is provided with a positive signal that the transmission is in neutral, then the electronic control unit begins to control the engine speed to approximate a desired engine speed at the next expected gear ratio. This engine synchronization assists the operator in re-engaging the transmission at the next desired gear. The operator then re-engages the gear, and a positive signal is then sent to the electronic control unit that the gear is engaged. The electronic control unit may then return the operation of the engine to the operator.

These and other features of the present invention can be best understood from the following specification and drawings, of which the following is a brief description.

BRIEF DESCRIPTION OF THE DRAWINGS

FIG. 1A is a highly schematic view of an engine and transmission system.

FIG. 2 shows the movement of a neutral switch system in a transition.

FIG. 3 shows the neutral switch system in a neutral position.

DETAILED DESCRIPTION OF A PREFERRED EMBODIMENT

Figure 1B:
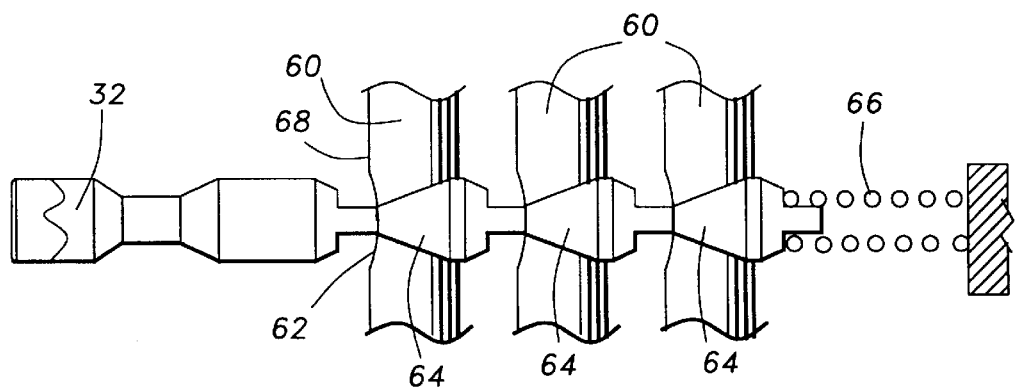
FIG. 1B shows mechanical connections of structure within the transmission that drives a neutral shaft.

FIG. 1A is a schematic of a vehicle drive train 20 incorporating an engine 22, an engine output shaft 23, a selectively actuated clutch 24, and a transmission 25 having an input shaft 26 driven by the engine output shaft 23 through clutch 24. Transmission 26 is a multi-speed transmission, that can provide various gear ratios between its input shaft 26 and output shaft 30. A stick shift 28 with a shift intent button 29 allows an operator to change the speed ratio in the transmission 25 to change the ratio of the input speed at input shaft 26 relative to the output shaft 30. The structure of the transmission 25 may be as known in the art.

Transmission 25 also includes a neutral shaft 32. Neutral shaft 32 moves inwardly and outwardly as the transmission 25 moves between gear-engaged and neutral states. The prior art used a neutral shaft to send a single signal.

A neutral switch system 36 forms the inventive aspects of this Application. Neutral switch 36 sends signals to an electronic control unit 38 for the engine 22. The neutral switch system 36 incorporates a switch plunger 40 having a head 41 and a forward portion 42 that contacts a cam profile surface of neutral shaft 32. As shown in FIG. 1A, a forward relatively small portion 44 of the neutral shaft 32 is contacted by switch plunger 40. In this position, switch plunger 40 is positioned at a forward extreme within housing 45 and completes a circuit between the contacts at the forward end of housing 45. Neutral shaft 32 includes a ramped portion 46 and a relatively thicker portion 48. In the position shown in FIG. 1A, the transmission 25 is in a gear-engaged position. The electrical contact is completed by the head 41 of the plunger 40 and the bottom of housing 45. A signal that the gear is engaged is sent through line 50 to the electronic control unit 38. Thus, a positive signal is sent to the electronic control unit that the gear is engaged.

FIG. 1B shows a portion of neutral shaft 32 within the transmission housing. The portion shown in FIG. 1A is to the left of the FIG. 1B and not illustrated. The transmission includes a number of shift rails 60 that reciprocate with movement of the shift lever to shift the transmission. Those shift rails have cammed surfaces 62 that engage mating frustro-conical portion 64 on the neutral shaft 32. A spring 66 biases the neutral shaft to a position forced outwardly of the transmission. In the position shown in FIG. 1B the ramped surfaces 62 allow the spring 66 to force the neutral shaft 32 outwardly from the transmission. In this state, the transmission is in neutral, with no gear engaged.

Figure 1C:
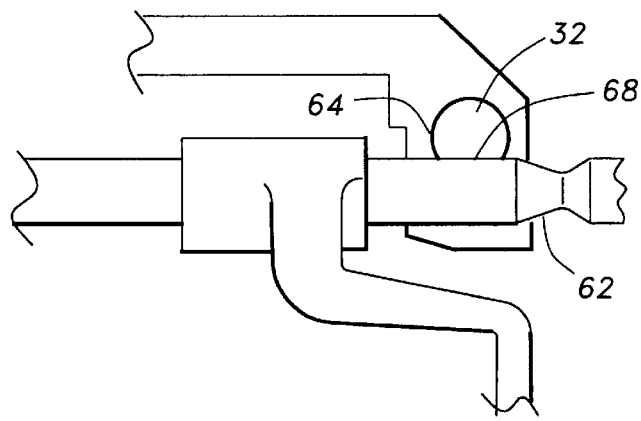
FIG. 1C shows other structure of the mechanical connection within the transmission.
Figure 4:
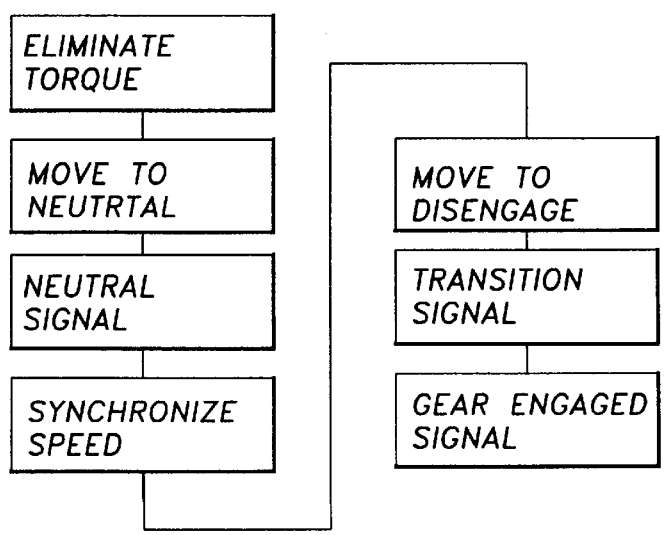
FIG. 4 is a flow chart of the logic utilized by the electronic control unit to control the engine speed.

FIG. 1C shows the shift rail 60 having been moved to a position where it has engaged a gear. As shown, the ramped surface 62 is no longer aligned with the frustro-conical portion 64 on neutral shaft 32. Instead, a thicker portion 68 is aligned with the neutral shaft 32. This thicker portion 68 engages the frustro-conical portion 64 and force it to be biased inwardly against the force of spring 66. In this position, the neutral shaft 32 is indicating a gear-engaged position, as shown in FIG. 1A. Thus, mechanical interconnections within the transmission ensure that the movement of the neutral shaft 32 is directly tied to the state of the transmission. The position of the neutral shaft 32 is thus a positive indication of whether the transmission is in neutral or a gear-engaged state.

As shown in FIG. 2, when the transmission begins moving out of engagement to a neutral position, the neutral shaft 32 moves to the left from the position shown in FIG. 1A. As the neutral shaft 32 moves in this direction, the forward portion 42 of switch plunger 40 begins to ride up ramped surface 46. In this position, the head 41 does not complete electric contact at either position within housing 45. As such, no signal is sent to the electronic control unit through either line 50 or 52. The electronic control unit now knows that the transmission is in transition between engaged and neutral states. The electronic control unit monitors the time between the engaged states to identify faults. If the transmission is in "transition" for too long, a fault is indicated.

When such a fault is sensed, a counter is incremented. The counter may be decremented by a good shift wherein there is not a transition for too long a period of time. A good shift may decrement the counter by a greater number than a bad shift would increase the counter. A fault signal could be actuated in the vehicle cab should the number of identified faults indicate that a trend is beginning to indicate the switch is failing. That is, if the counter reaches a relatively high number indicating that faults are occurring on most shifts, then the signal should be actuated. On certain shifts the operator may himself control the operation such that the transmission is in transition for an unusual time. As such, the counter is decremented on a good shift. Preferably, even when the counter is decremented the total number of faults is retained in a second counter for diagnostic purposes.

On the other hand, if both switches are ever indicated as being engaged, a fault is also identified. In such a case, then the speed ratio is compared to expected speed ratios and a determination is made as to whether the transmission is in gear or is in neutral based upon whether the actual speed ratio matches an expected speed ratio as outlined above.

As shown in FIG. 3, the neutral shaft 32 has now moved to an outermost extent. The transmission is now in neutral, with no gear engagement. As shown, forward portion 44 is received within valve 34. A range shift can now occur. As also shown, the inventive plunger switch 40 is now in contact with the thicker portion 48. Head 41 is now driven to a second extreme position in housing 45, and an electric circuit is again completed. A signal of this position is sent through line 52 to the electronic control unit 38.

Although the movement of the switch plunger 40 is shown to extend beyond the ramp portion 46, in practice, it may only be necessary to utilize the extremes of the ramped portion to define the extreme positions for the neutral and gear-engaged locations of switch 40. In addition, if some geometric dimensions require additional link for the switch plunger, a separate shaft may be placed intermediate the switch plunger 40 and the surface of the neutral shaft 32.

The inventive switch providing positive feedback of both gear-engaged and neutral states is an improvement over the prior art. In the prior art, only one position was provided with a positive signal.

As shown in FIG. 1A, signal line 50 and signal line 52 are two digital signals. Alternatively, the two signal lines 50 and 42 could be combined with distinct resistances into a single analog signal.

The new switch system with positive feedback is particularly valuable in a system which attempts to control the engine speed to eliminate the need for clutching when shifting gears. In one such inventive system illustrated, the ECU 38 senses through an operator input, such as switch 29, that the operator would like to move the transmission to neutral. The electronic control unit 38 would then "break" the torque load between the engine and the transmission without clutching. Essentially, the electronic control unit will attempt to change the engine output to eliminate any torque load on the transmission 25. At that point, the operator should be able to move the transmission 25 to neutral. As the transmission begins to move towards neutral, the plunger 40 will begin to move from the position shown in FIG. 3 to a position approximately equal to that shown in FIG. 2. It should be noted that this movement will occur independent of whether the operator uses a clutch of the ECU to break the torque load. The electronic control unit will now know that the neutral shaft 32 has begun moving toward neutral. Eventually, the neutral shaft 32 will reach the position shown in FIG. 3, and the electronic control unit 38 will be provided a signal through line 50 that the transmission is now in neutral.

At that time, the electronic control unit will begin to change the engine speed to a speed that is calculated to match the synchronization speed necessary at the output shaft 30 for the next speed ratio which is to be expected. The operator will be able to provide an indication of whether an upshift or a downshift is next expected through switch 29, and the electronic control unit 38 will calculate the desired engine input speed based upon that next selected gear ratio. The desired speed is determined by multiplying the transmission output speed with this ratio.

The electronic control unit is provided with a positive signal of neutral and will not begin to modify the output speed of the engine until the neutral signal is received. Thus, the electronic control unit will not change the vehicle speed when engine speed is modified to achieve the speed synchronization. Moreover, since a positive signal is provided to the electronic control unit when the transmission is re-engaged, the electronic control unit will know when it can deactivate modification of the engine speed and return control to the operator.

The basic engine control system as disclosed above is disclosed and claimed in co-pending U.S. patent application Ser. No. 08/508,135, entitled "ENGINE SPEED SYNCHRONIZATION SYSTEM FOR ASSISTING A MANUAL TRANSMISSION SHIFT." The system for eliminating torque when moving the transmission out of gear towards neutral is disclosed in co-pending U.S. patent application Ser. No. 08/508,155, entitled "METHOD AND APPARATUS FOR ASSISTING AND SHIFTING TRANSMISSION TO NEUTRAL." Other features of a system that would preferably incorporate this inventive switch are disclosed in co-pending U.S. patent application Ser. No. 08/508,153, entitled "FOUR-POSITION SWITCH FOR SHIFT ASSIST SYSTEM"; U.S. patent application Ser. No. 08/508,057, entitled "OPERATOR INPUT SYSTEM FOR GEAR SHIFT ASSIST MECHANISM;" co-pending U.S. patent application Ser. No. 08/507,996, entitled "AUTOMATIC RANGE SHIFT FOR MULTI-SPEED TRANSMISSION;" co-pending U.S. patent application Ser. No. 08/508,111, entitled "ENGINE SPEED RETARDATION ON A TRANSMISSION UPSHIFT;" and U.S. patent application Ser. No. 08/508,156 entitled "COMBINED SYSTEM FOR ASSISTING SHIFTING OF MANUAL TRANSMISSION WITHOUT CLUTCHING." The above applications are all being filed on the same day as this application.

Although a preferred embodiment of this invention has been disclosed, a worker of ordinary skill in the art would recognize that certain modifications would come within the scope of this invention. For that reason, the following claim should be studied to determine the true scope and content of this invention.

We claim:

1. A method of controlling a manual vehicle transmission having a shift lever that is manually operable to effect a change in gears within the transmission and an electronic controller that controls engine speed to assist in manually effecting a gear shift, comprising the steps of:

(A) determining when the transmission is in a first state where the transmission is fully engaged in a gear ratio;

(B) generating a first signal only when the first state of step (A) exists;

(C) determining when the transmission is in a second state where the transmission is in neutral;

(D) generating a second signal only when the second state of step (C) exists; and (E) communicating the first and second signals to the electronic controller and thereby enabling the electronic controller to appropriately control the engine speed to assist in a manual gear shift.

2. The method of claim 1, further comprising the step of determining a simultaneous absence of the first and second signals as indicating that the transmission is in a transition state between the first and second states.

3. The method of claim 2, further comprising the step of monitoring a time period that the transition state exists and determining a fault condition when the time period exceeds a preselected maximum.

4. The method of claim 1, wherein step (E) is performed by using the electronic controller to control the engine speed beginning with receiving the second signal and returning control of the engine speed to a vehicle operator upon receiving the first signal.

5. The method of claim 4, further comprising beginning the control of the engine speed with receiving the second signal only after the first signal has been previously received.

6. The method of claim 4, wherein controlling the engine speed includes the step of causing the engine speed to approach a value that corresponds to a synchronous condition between an output shaft of the engine and an input shaft of the transmission for a gear ratio that is manually selected by the vehicle operator.

7. The method of claim 1, wherein the transmission includes a neutral shaft that moves between a first position when the transmission is in the first state and a second position when the transmission is in the second state and wherein steps (B) and (D) are performed when the neutral shaft is in the first and second positions, respectively.

8. A system for controlling a vehicle transmission that is driven by an engine, comprising:

a manual stick shift that is coupled with the transmission to allow an operator of the vehicle to manually move the transmission into a selected gear ratio;

an electronic controller that is coupled with the engine to control a speed of the engine;

a neutral shaft that moves between a first position when the transmission is fully engaged in a gear ratio and a second position when the transmission is fully in neutral; and a switch assembly that generates a first signal responsive to said neutral shaft being in said first position and a second signal responsive to said neutral shaft being in said second position;

wherein said electronic controller controls the engine speed according to receipt of said first and second signals, respectively.

9. The system of claim 8, wherein said switch assembly includes a first and a second electrical contact and wherein an electrical connection with said contacts generates said first and second signals, respectively.

10. The system of claim 9, wherein said switch assembly includes a moving member that moves responsive to movement of said neutral shaft and wherein said moving member makes an electrical connection with said first contact when said neutral shaft is in said first position such that said first signal is generated and said moving member makes an electrical connection with said second contact when said neutral shaft is in said second position such that said second signal is generated.

11. The system of claim 10, wherein said neutral shaft includes a cam surface and wherein said moving member rides along said cam surface toward and away from electrical contact with said contacts as said neutral shaft moves between said first and second positions.

12. The system of claim 11, wherein said switch assembly includes a housing and said first and second contacts are supported at opposite ends of said housing and wherein said moving member comprises a plunger that moves through said housing.

13. The system of claim 8, wherein said switch assembly does not provide any signal when said neutral shaft is neither in said first position nor said second position.

14. A method of controlling a manually shiftable vehicle transmission comprising the steps of:

(A) generating an electrical signal when the transmission is fully in neutral;

(B) generating an electrical signal when the transmission is fully engaged in a selected gear ratio;

(C) Determining that the transmission is in neutral based upon the signal of step (A);

(D) Determining that the transmission is in gear based on the signal of step (B); and (E) Determining that the transmission is in a transition state when neither signal from steps (A) and (B) exist.

15. A method of controlling a vehicle drive comprising the steps of:

a) providing an engine for transmitting rotational drive to an input shaft, and a transmission for receiving said rotational drive and rotating an output shaft, providing an element between said input and output shafts for selectively transmitting rotational drive from said output shaft from said input shaft, or not transmitting said rotational drive, said elements being capable of being in a fully engaged position, or a fully disengaged position;

b) determining when said element is in its fully engaged position;

c) generating a signal when said element is in said first position;

d) determining when said element is in said fully disengaged position;

e) generating a second signal when said element is in said fully disengaged position; and f) communicating said first and second signals to an electric control unit for at least one of said engine and said transmission.

16. A method as recited in claim 15, wherein said element is the vehicle transmission.

* * * * *

UNITED STATES PATENT AND TRADEMARK OFFICE
CERTIFICATE OF CORRECTION

PATENT NO.   : 5,879,267
DATED        : March 9, 1999
INVENTOR(S)  : Desautels, et al.

It is certified that error appears in the above-identified patent and that said Letters Patent is hereby corrected as shown below:

<u>Title Page, Item [73]</u>
Assignee:   Meritor Heavy Vehicle Systems, LLC.
            Troy, MI Detroit Diesel Corporation
            Detroit, MI Signed and Sealed this Thrity-first Day of July, 2001

*Attest:*

*Attesting Officer*

NICHOLAS P. GODICI
*Acting Director of the United States Patent and Trademark Office*